UNITED STATES PATENT OFFICE.

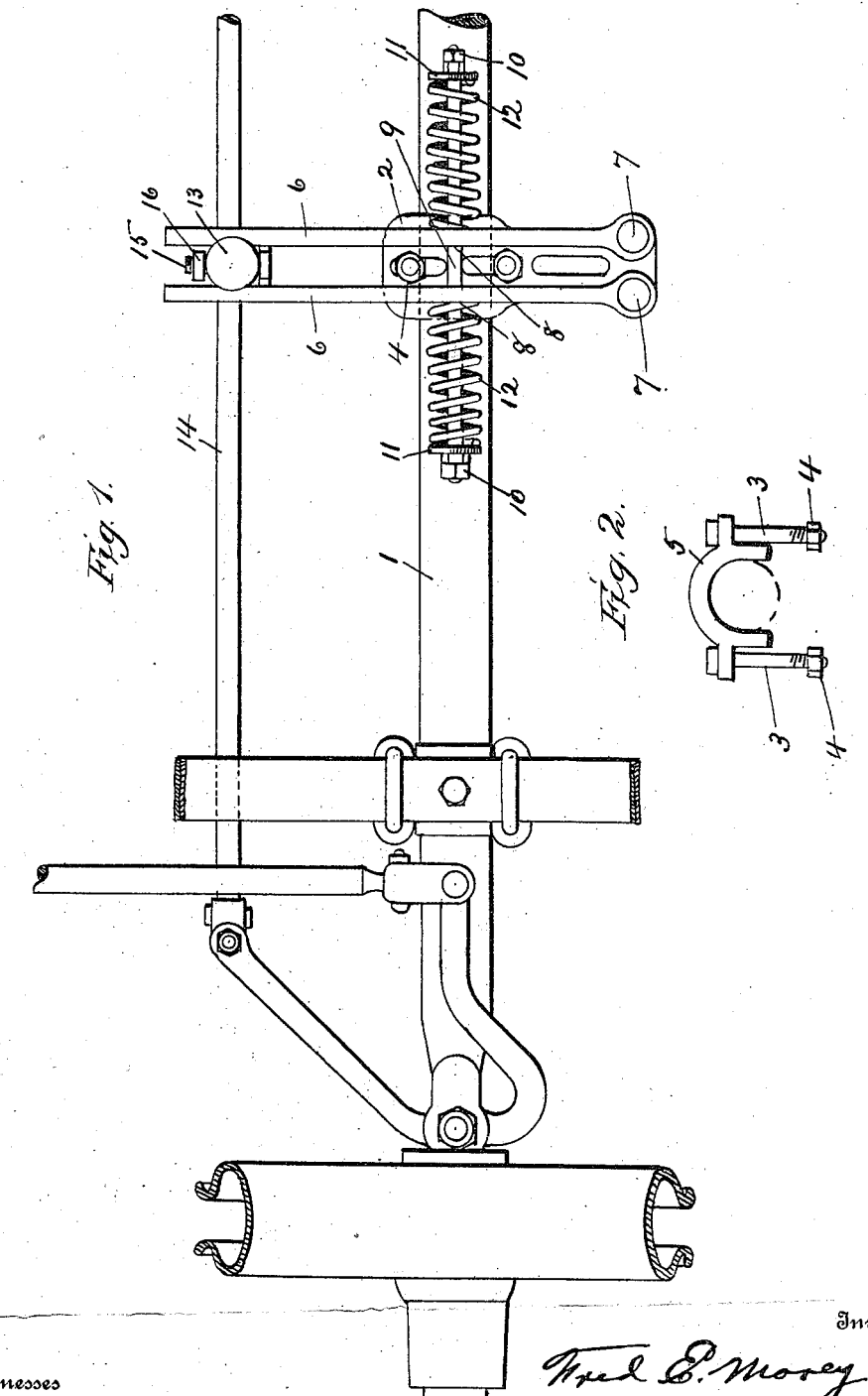

FRED E. MOREY, OF BARABOO, WISCONSIN.

VEHICLE STEERING DEVICE.

984,960.  Specification of Letters Patent.  Patented Feb. 21, 1911.

Application filed April 1, 1909. Serial No. 487,237.

*To all whom it may concern:*

Be it known that I, FRED E. MOREY, a citizen of the United States, residing at Baraboo, in the county of Sauk and State of Wisconsin, have invented certain new and useful Improvements in Vehicle Steering Devices, of which the following is a specification.

My invention relates to vehicle steering devices, for the purpose of directing and holding the vehicle normally in a direct line, and to take up jar and the like, which usually emanates from contact with obstructions, or in steering.

A further object of the device is to automatically return the device to its direct line when it has been thrown, either intentionally or otherwise, from the same.

With these and other objects in view, the invention consists in a series of springs, levers, and connecting devices, which can be easily attached to a vehicle, can be cheaply manufactured, and the parts thereof can be renewed with little trouble when broken or worn.

In the drawings forming a part of this specification, and in which like symbols of reference represent corresponding parts in the several views:—Figure 1 is a sectional plan view of the device, as it appears applied to an automobile, or the like; and, Fig. 2 is a transverse section of the strap and bolts for connecting the plate to the axle.

1 represents the front axle of the vehicle; 2 the plate which is clamped to the same by means of bolts 3, 3; 4, 4, nuts operating on bolts 3; and 5 a strap.

6, 6, are levers connected to the ends of the plate 2 by means of bolts 7, 7; and 8 are perforations through levers 6, 6. The perforations 8 receive rod 9, said rod having adjusting nuts 10, 10, at its ends, and washers 11, 11.

12, 12, are springs on rod 9, which contact with washers 11 and levers 6; and thus hold the levers in contact with nuts 4, and with a stud 13, said stud embracing and being clamped to steering rod 14 by means of bolt 15 and nut 16.

The operation of the device will be apparent from foregoing. The springs are regulated by the nuts, as desired, and when the vehicle is in a straight position the levers lie against stud 13 and nuts 4. When the lever has been operated to steer the vehicle, the springs automatically return it to its direct position. Thus the car or automobile is held in a straight ahead position, avoiding accidents from front wheels striking obstructions in the road; or if the steering gear should break or become disarranged my steering device holds the car in correct position. This device also avoids strain on the steering rod when the car is straight.

Having now fully described my invention, what I claim as new and desire to secure by Letters-Patent, is:—

1. A vehicle steering device, consisting of an axle, a plate adapted for connection to the axle, a plurality of levers pivotally connected to said plate, springs to control the levers, and means connected to the steering rod to control the free ends of the levers.

2. A vehicle steering device, consisting of a steering rod, an axle, a stud on the steering rod, a plate connected to the axle, levers pivoted to the plate and contacting with the stud, and springs to control the levers.

3. In a vehicle steering device, the combination with the axle of the same, of a steering rod, a stud connected to the steering rod, a plate adapted for attachment to the axle of a vehicle, levers pivotally connected to the plate and contacting with the stud on the steering rod, and means for controlling the levers.

4. In a vehicle steering device, the combination with the axle of a vehicle, of a steering rod, a stud connected to said rod, a plate adapted for connection to the axle, levers co-acting with said stud to hold the rod in a predetermined position, and means for controlling said levers.

5. In a steering device, a stud adapted for connection to the steering rod, levers contacting with said stud, means for connecting the levers to the axle of a vehicle, and means for normally holding the levers parallel to each other.

6. A vehicle steering device, consisting of an axle, a plate adapted for attachment to the axle, levers pivotally connected to the plate, a stud adapted for attachment to the steering rod between the free ends of the levers to control the same, and springs contacting laterally with the levers and adapted to hold them in contact with the stud.

7. A vehicle steering device, consisting of a plate adapted for attachment to the axle of a vehicle, levers formed with perforations and having pivotal connection to the axle plate, a stud connected to the steering gear and adapted to control the free ends of the levers, a rod passing through the perforations in the levers, springs upon said rod, and adjusting nuts to hold the springs laterally against the levers.

In testimony whereof I affix my signature in presence of two witnesses.

FRED E. MOREY.

Witnesses:
 EVAN EVANS,
 H. GEO. SOPHORST.